(12) United States Patent
Furay

(10) Patent No.: US 6,313,984 B1
(45) Date of Patent: Nov. 6, 2001

(54) LOW PROFILE HARD DISK DRIVE ASSEMBLY MOUNTING TO COMPUTER MOTHERBOARD

(75) Inventor: David M. Furay, Boulder, CO (US)

(73) Assignee: Mobile Storage Technology, Inc., Milpitas, CA (US)

( * ) Notice: Subject to any disclaimer, the term of this patent is extended or adjusted under 35 U.S.C. 154(b) by 0 days.

(21) Appl. No.: 09/479,008

(22) Filed: Jan. 7, 2000

(51) Int. Cl.$^7$ .................................................. H05K 01/18
(52) U.S. Cl. ........................ 361/685; 361/683; 361/684; 361/758; 361/804; 361/807; 312/332; 312/333; 174/138 G
(58) Field of Search .................................. 361/685, 683, 361/684, 758, 804, 807, 809; 312/332, 333; 174/138 G

(56) References Cited

U.S. PATENT DOCUMENTS

| | | | |
|---|---|---|---|
| 5,136,468 | * | 8/1992 | Wong et al. .......................... 361/683 |
| 5,214,567 | * | 5/1993 | Feightner et al. .................... 361/685 |
| 5,469,314 | | 11/1995 | Morehouse et al. ................. 360/105 |
| 5,566,383 | * | 10/1996 | Gildea et al. ........................ 361/685 |
| 5,587,879 | * | 12/1996 | Spano et al. ......................... 361/685 |
| 5,694,267 | | 12/1997 | Morehouse et al. .............. 360/97.02 |
| 5,740,020 | * | 4/1998 | Palatov ................................. 361/796 |
| 5,793,616 | * | 8/1998 | Aubuchon et al. .................. 361/784 |
| 5,995,365 | * | 11/1999 | Broder et al. ........................ 361/685 |
| 6,205,020 | * | 3/2001 | Felcman et al. ..................... 361/683 |
| 6,229,699 | * | 5/2001 | Kerrigan et al. ..................... 361/684 |

* cited by examiner

Primary Examiner—Leo P. Picard
Assistant Examiner—David Foster
(74) Attorney, Agent, or Firm—Skjerven Morrill MacPherson LLP; Christopher B. Allenby

(57) ABSTRACT

A hard disk drive assembly is electrically connected to a printed circuit board assembly motherboard using a connector on the hard disk drive assembly connected with a mating connector mounted on the motherboard. The hard disk drive assembly is secured to standoffs that allow sufficient space between the hard disk drive assembly and the motherboard for an integrated circuit package to be positioned between the hard disk drive assembly and the motherboard.

13 Claims, 7 Drawing Sheets

LOW PROFILE HARD DISK DRIVE ASSEMBLY MOUNTING TO COMPUTER MOTHERBOARD

BACKGROUND

1. Field of Invention

The present invention relates to hard disk drive assembly mounting on printed circuit boards, and in particular to hard disk drive assembly mounting on a portable computer motherboard.

2. Related Art

Consumers prefer portable computers that are both thin and occupy a small area (small footprint). Accordingly, portable computer manufacturers design machines so that internal components are closely positioned to one another. Portable computer major components typically include a large printed circuit board assembly (PCBA) including a printed circuit board (PCB) and attached integrated circuits (e.g., central processing unit and associated memory) that enable the computer to function ("motherboard"). This application refers to specific embodiments using motherboards, but persons skilled in computer design will understand that embodiments of this invention include PCBAs other than portable computer motherboards. Major components also typically include a hard disk drive assembly (HDDA) for information storage that is coupled to the motherboard. HDDAs typically include a hard drive assembly (HDA) (one or more rotating hard disks with associated read/write heads in a protected and filtered environment) and another printed circuit board assembly attached to the HDA that contains circuits controlling HDA operation and data input/output functions.

FIG. 1 is a plan view of a typical portable computer motherboard and HDDA layout. As shown, motherboard 10 includes several integrated circuit packages 12. Packages 12 contain the integrated circuit (IC) chips that perform basic functions that enable the computer to operate (e.g., central processor unit, random access memory, video controller, etc.). Motherboard 10 also includes a connector 14 used to connect a HDDA to selected ICs. As shown, motherboard 10 includes a cutout portion 16 in which HDDA 18 is positioned. HDDA 18 is secured to chassis 20 or other supporting apparatus using mounting brackets 22. HDDA 18 is electrically coupled to connector 14 via conventional interconnection 24 (e.g., flexible printed circuit or multi-wire ribbon cable; see e.g., U.S. Pat. No. 5,469,314 commonly assigned with the present application and incorporated herein by reference).

The area required by the motherboard and hard disk drive assembly combination limits size reduction of the portable computer. One possible way of reducing the area is to position the HDDA over or under the motherboard. However, HDDAs used in portable computers, such as HDDA 18, are typically approximately 9.5 millimeters (mm) thick. Thus positioning the HDDA vertically in relation to the motherboard results in a combination that is too thick. Furthermore, the flexible circuit connecting the HDDA to the motherboard contributes additional bulk to the HDDA and motherboard combination. What is desired is a way to reduce the area required by the HDDA and motherboard combination, while ensuring the minimum possible thickness.

SUMMARY

In accordance with the invention, a thin hard disk drive assembly includes an electrical connector that is directly connected to a mating electrical connector on the motherboard. When the connectors are mated the HDDA is positioned over the motherboard. The HDDA is configured so that when the connectors are mated, at least a portion of one or more integrated circuit packages on the motherboard are between the HDDA and the motherboard's printed circuit board.

In some embodiments the hard disk drive assembly is secured to standoffs that provide the space for the integrated circuit packages between the HDDA and the motherboard. In some embodiments the offsets are attached to the computer chassis; in others, to the motherboard; in still others, to the HDDA. Embodiments of this invention are used in, for example, portable computers. These embodiments allow portable computers to be made smaller and lighter than current portable computers because motherboard space or chassis space is not sacrificed to accommodate a hard disk drive assembly.

DETAILED DESCRIPTION

Persons in the field will understand that some elements have been omitted from the accompanying drawings so as to more clearly show and describe the invention.

Figure 1:
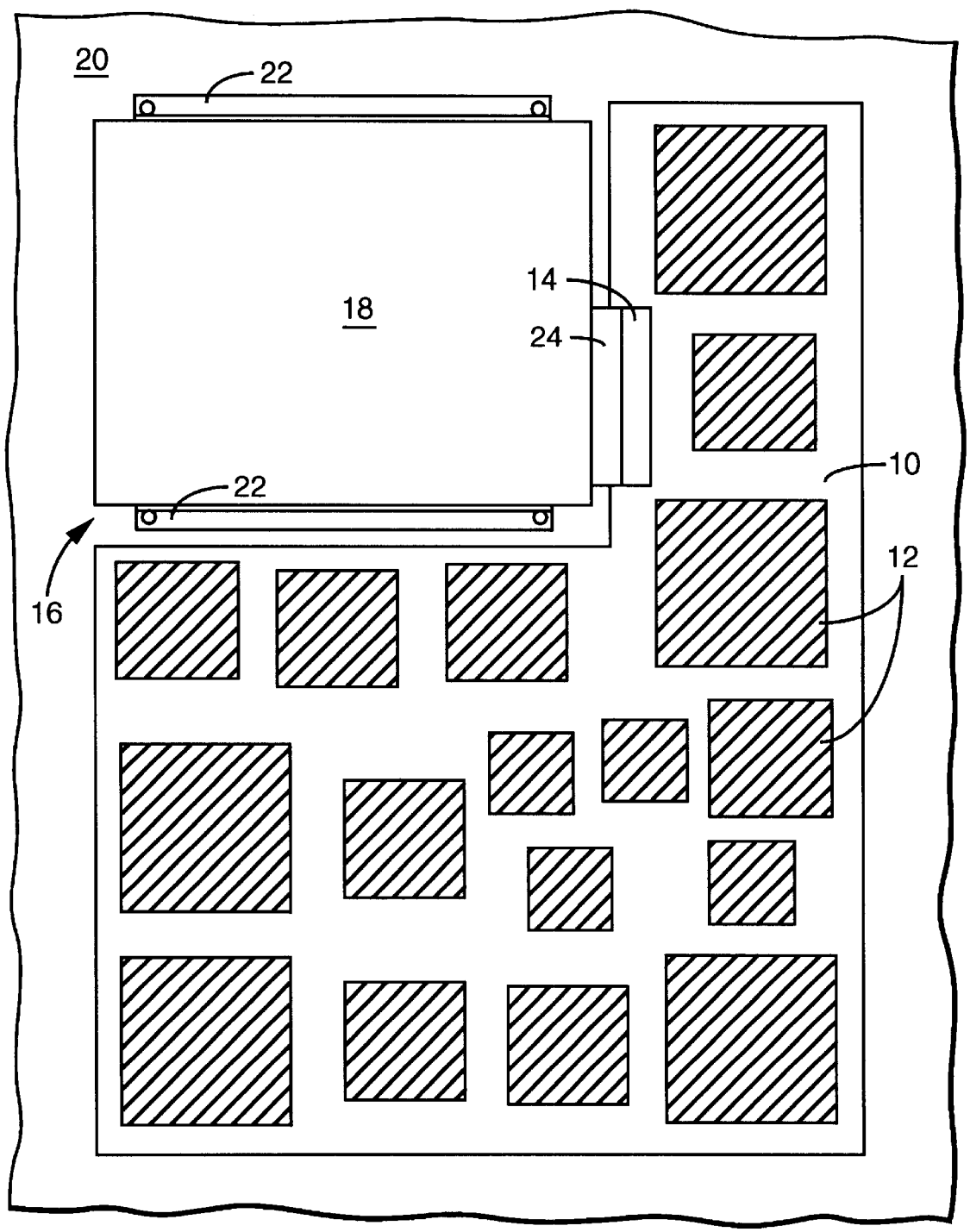
FIG. 1 is a plan view of a typical hard disk drive assembly and computer motherboard layout.
Figure 2:
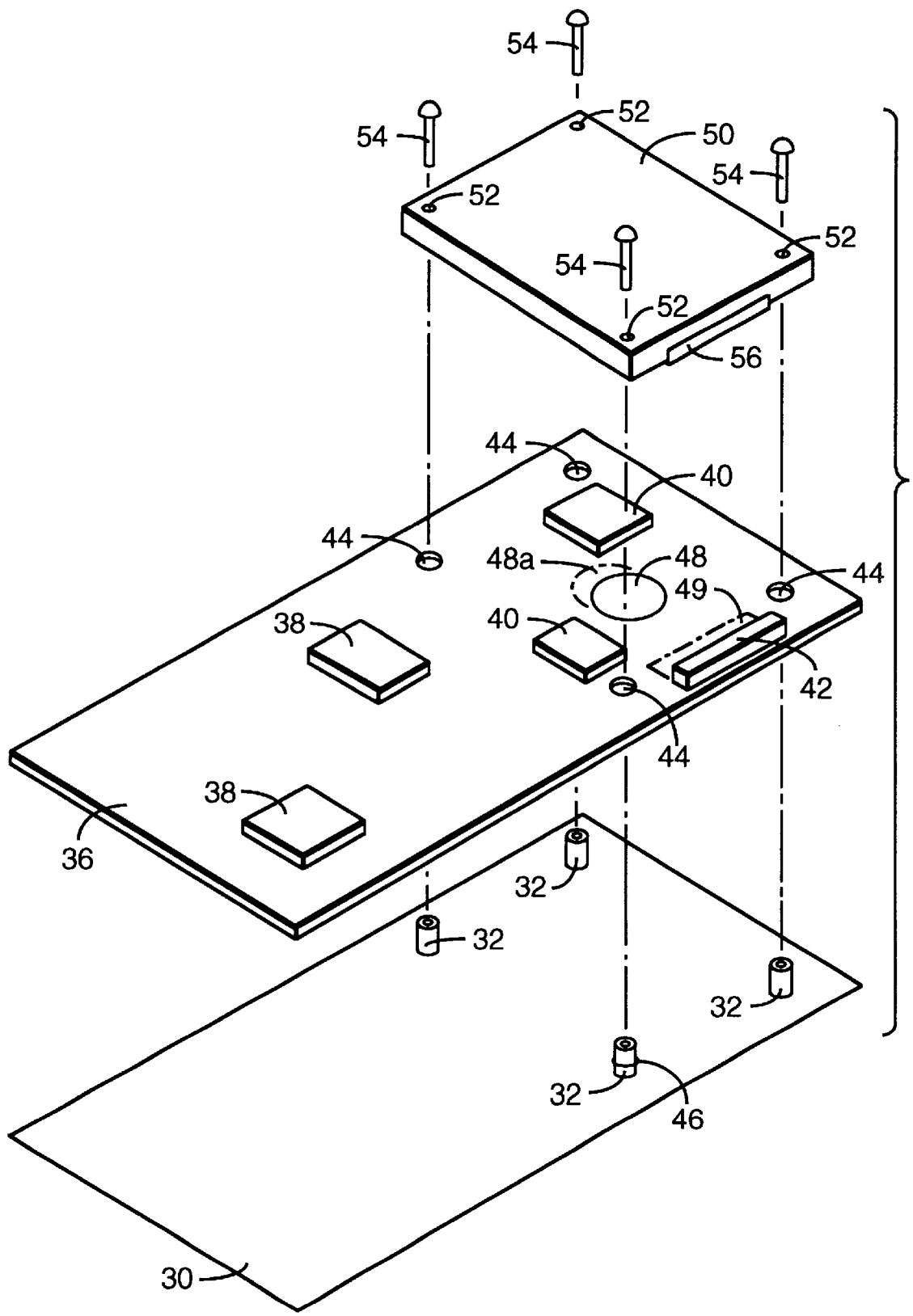
FIG. 2 is an exploded perspective view of an embodiment of the invention.

FIG. 2 is an exploded perspective view of an embodiment of the invention. Support chassis 30 is a part of a portable computer (not shown). Chassis 30 may be an integral part of the portable computer housing and may be formed of a rigid material (e.g., plastic). Or, chassis 30 may be a separate component within the housing. Standoffs 32 are shown positioned on chassis 30. In some embodiments standoffs 32 may be integral to chassis 30. That is, chassis 30 and standoffs 32 are one integrally molded piece. In other embodiments standoffs 32 may be conventional standoffs, such as PEM® standoffs manufactured by Penn Engineering & Manufacturing of Danboro, Pa., conventionally mounted on chassis 30. Persons skilled in the field will understand the methods used to position and mount such conventional standoffs. In still other embodiments the standoffs are integrally formed with the hard disk assembly housing.

FIG. 2 also shows motherboard 36 that includes conventional integrated circuit packages, such as packages 38 and 40, mounted on a conventional printed circuit board. Packages 40 are conventional low profile packages having a thickness of approximately 1.7 mm. Also mounted on motherboard 36 is electrical connector 42. In some embodiments connector 42 is a conventional multi-pin female electrical connector. Connector details are described in more detail below.

Motherboard 36 also includes holes 44 that are positioned in the printed circuit board so as to be aligned with standoffs 32. In some embodiments holes 44 are made slightly larger than the outside diameter of standoffs 32. In other embodiments holes 44 have approximately the some diameter as the outside diameter of standoffs 32, thus allowing standoffs 32 to provide frictional support to motherboard 36. Additional support for motherboard 36 may in some embodiments be provided by one or more support flanges 46 on standoffs 32 (shown on only one standoff for clarity).

Also depicted is clear area 48 on motherboard 36. As described below, packages 40 may not be positioned within clear area 48 which is reserved to accommodate a hard disk drive assembly motor housing, discussed below. In some embodiments clear area 48 is approximately circular. In other embodiments clear area 48 is elongated away from connector 42 in an approximately oblong shape to allow for disk drive assembly slide-in mounting as described below.

Figure 7:
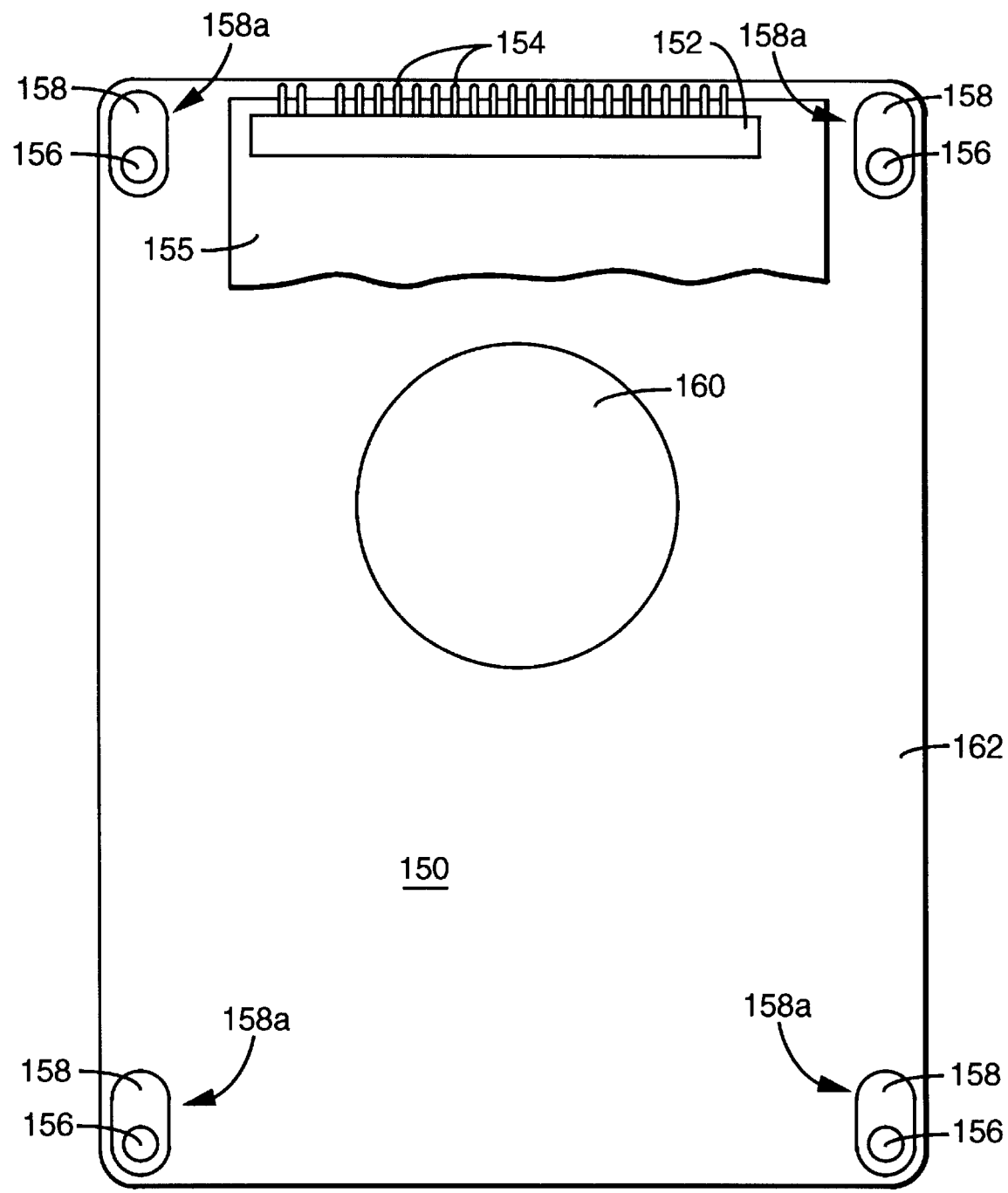
FIG. 7 is a bottom view of a hard disk drive assembly.

FIG. 2 shows hard disk drive assembly 50 that includes a hard disk assembly and a small printed circuit board assembly attached to the bottom (not shown; see e.g., FIG. 7). In some embodiments, HDDA 50 includes a three-inch (3 in.) hard disk assembly that has an overall thickness of approximately 7.5 mm. Holes 52 are positioned in each corner of HDDA 50 to allow screws 54 to pass through and secure HDDA 50 to chassis 30. As shown, screws 54 connect directly to standoffs 32. In other embodiments, screws 54 may pass through standoffs 32 to be secured by nuts or other fasteners (not shown) against the underside of chassis 30.

Hard disk drive assembly 50 includes electrical connector 56 that in some embodiments is mounted on the HDDA's printed circuit board assembly. In some embodiments connector 56 is a conventional multi-pin male connector configured to mate with connector 42. Details regarding the connectors are described below.

Figure 3:
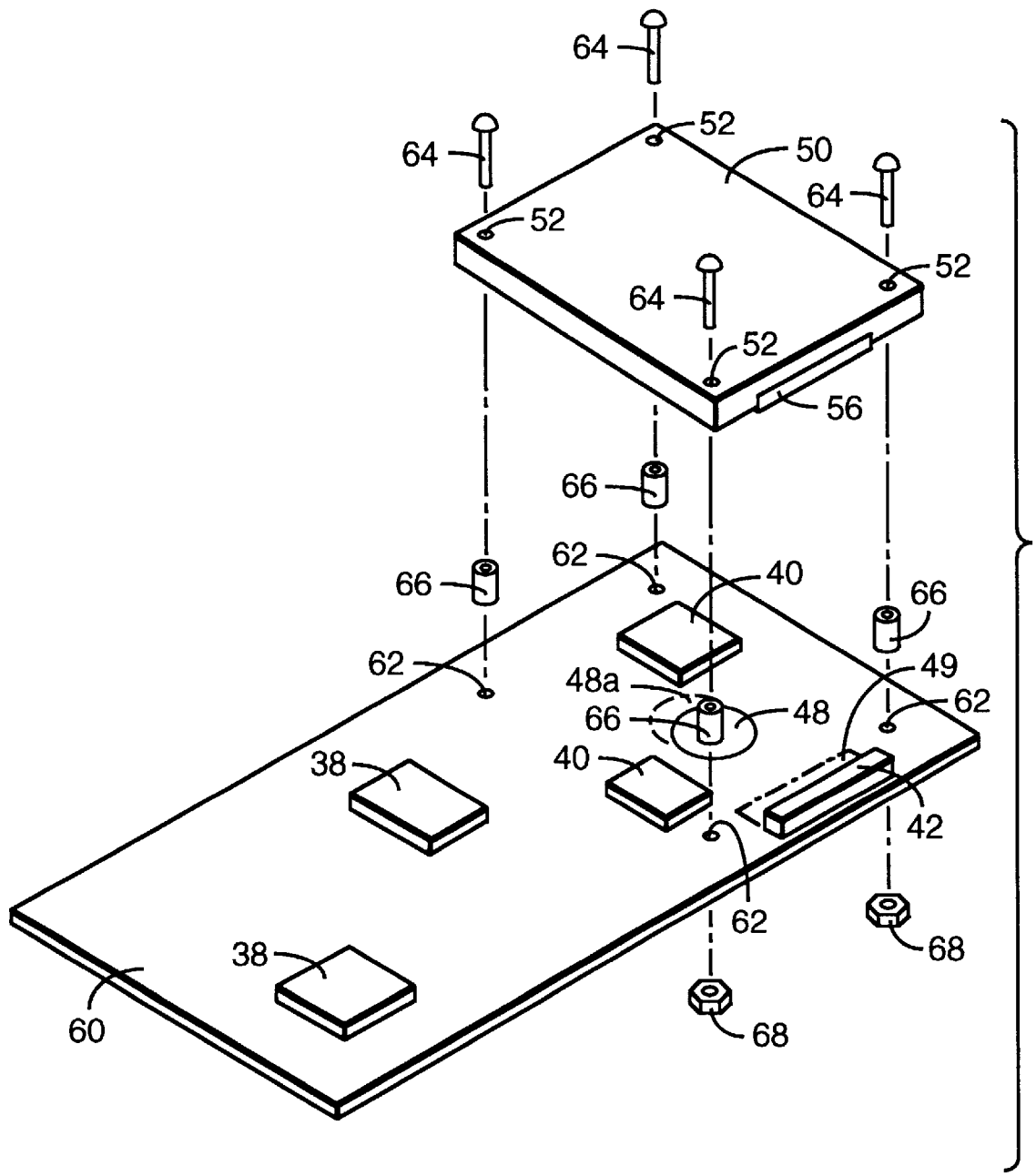
FIG. 3 is an exploded perspective view of a second embodiment of the invention.

FIG. 3 is an exploded perspective view of a second embodiment of the invention. As shown, integrated circuit packages 38 and 40, and connector 42, are conventionally mounted on motherboard 60. Integrated circuit packages are not mounted in clear area 48. Holes 62 are positioned motherboard 60's printed circuit board so as to be aligned with holes 52 in HDDA 50. Holes 62 are sized to receive conventional screws 64. Conventional standoffs 66 ensure that HDDA 50 remains spaced apart from motherboard 60. The standoffs may be mounted to the motherboard or to the HDDA, similar to the embodiment as shown and described in relation to FIG. 2. Screws 64 pass through holes 52, standoffs 66, and holes 62, and are secured by nuts 68 (two of which are not shown), thereby securing HDDA 50 to motherboard 60. Connectors 42 and 56 are properly mated when HDDA 50 is secured to motherboard 60.

Figure 4:
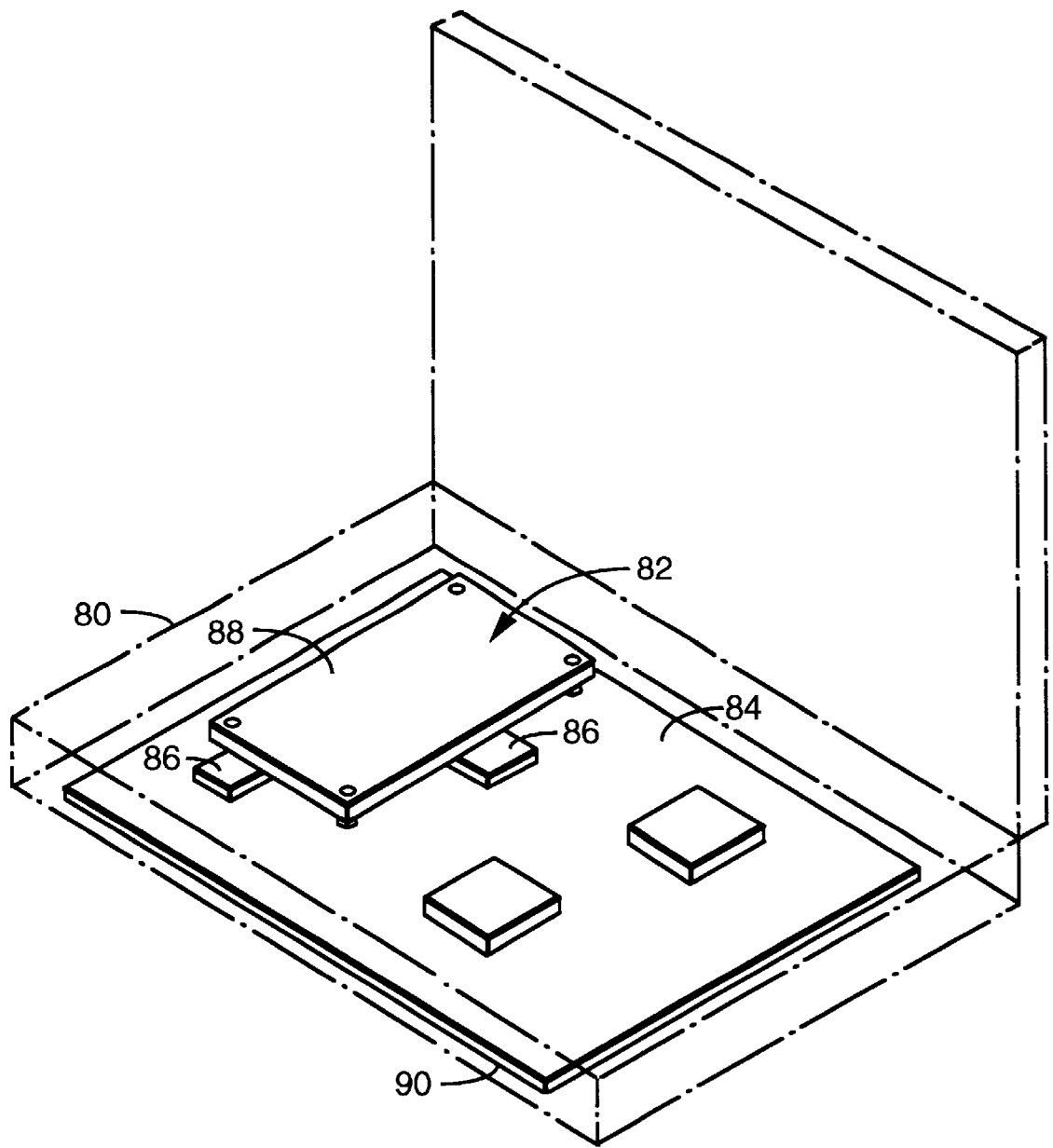
FIG. 4 is a perspective view showing an embodiment of the invention mounted in a computer chassis.

FIG. 4 shows an embodiment of the invention installed in a conventional portable laptop computer chassis 80. As shown, HDDA 82 is mounted directly on motherboard 84 in accordance with the invention. Several integrated circuit packages 86 are mounted on motherboard 84 as well, and are at least partially covered by drive assembly 82. FIG. 4 is illustrative, and many configurations of the motherboard and the HDDA mounting position exist. An important advantage of the present invention is the reduced distance between top surface 88 of HDDA 82 and bottom surface 90 of motherboard 84 (thickness of the combined assembly of HDDA and PCBA). At the same time, the area covered by the combination of motherboard 84 and HDDA 82 is reduced, so that chassis 80 is made smaller and lighter.

Figure 5:
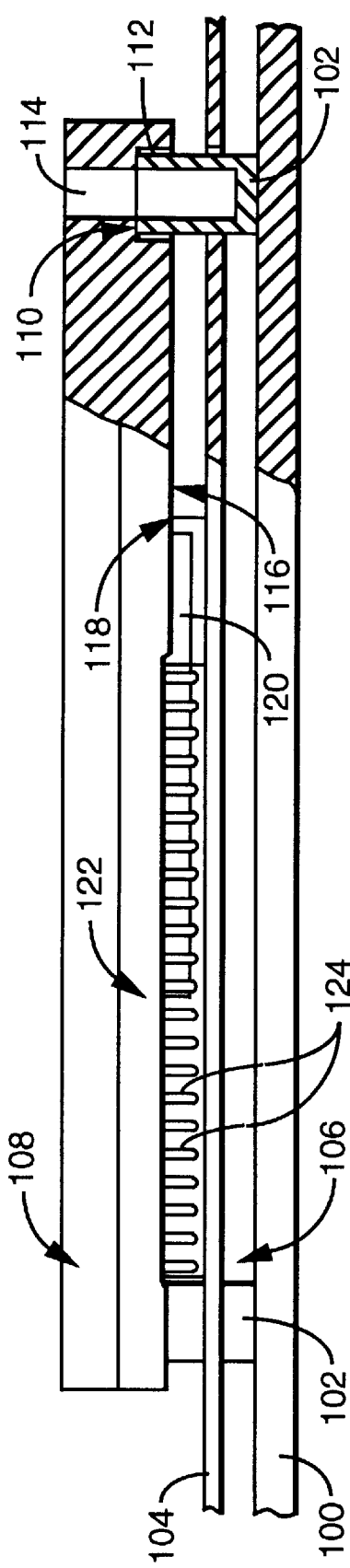
FIG. 5 is a side view of a third embodiment of the invention.

FIG. 5 is a side and cutaway view of hard disk drive assembly 108 mounted in accordance with the present invention. The embodiment shown in FIG. 5 corresponds to the embodiment shown in FIG. 2. Several elements, such as the female connector on the motherboard, have been omitted for clarity. Shown is support chassis 100 (e.g., chassis 30 as shown in FIG. 2). Conventional standoffs 102 extend between support chassis 100 and HDDA 108 through motherboard 104. In some embodiments support flanges (not shown) are placed around one or more of standoffs 102 so as to keep motherboard 104 spaced apart from chassis 100. The support flanges are positioned as shown by arrow 106. HDDA 108 is secured to standoffs 102 using screws (not shown) or other conventional fasteners.

As shown, HDDA 108 rests on top surfaces 110 of standoffs 102 and is parallel to board 104. In the embodiment shown, standoffs 102 extend into recesses 112 in the housing of HDDA 108. In this embodiment, HDDA 108 is secured to chassis 100 by conventional fasteners (e.g., screws) (not shown) passing through holes 114 and gripping standoffs 102.

In the embodiment shown, the lengths of standoffs 102 places bottom surface 116 of HDDA 108 approximately 2.0 millimeters (mm) from top surface 118 of motherboard 104's printed circuit board. This standoff size keeps bottom surface 116 from touching any low-profile integrated circuit packages (not shown) mounted on the motherboard.

Spin motor housing 120 extends below bottom surface 116. In one embodiment there is approximately 0.4 mm between top surface 118 and motor housing 120. Clear area 48 (FIG. 2) accommodates motor housing 120.

As mentioned above, HDDA 108 includes a small printed circuit board attached to the hard disk assembly. In the embodiments shown, connector 122 is mounted to this HDDA printed circuit board (see FIG. 7). As shown, connector 122 has a plurality HDDA 108. In the FIG. 5 embodiment, pins 124 are aligned approximately perpendicular to motherboard 104 and insert into a corresponding female connector (not shown; see e.g., connector 42 in FIG. 2) mounted on board 104. Thus when disk drive assembly 108 is mounted atop standoffs 102, connector 122 is mated with the connector on motherboard 104. This mating establishes electrical contact between HDDA 108 circuits and conductive traces defined on motherboard 104. In one embodiment pins 124 are configured in a conventional 44-pin arrangement. Other pin configurations may be used.

Figure 6:
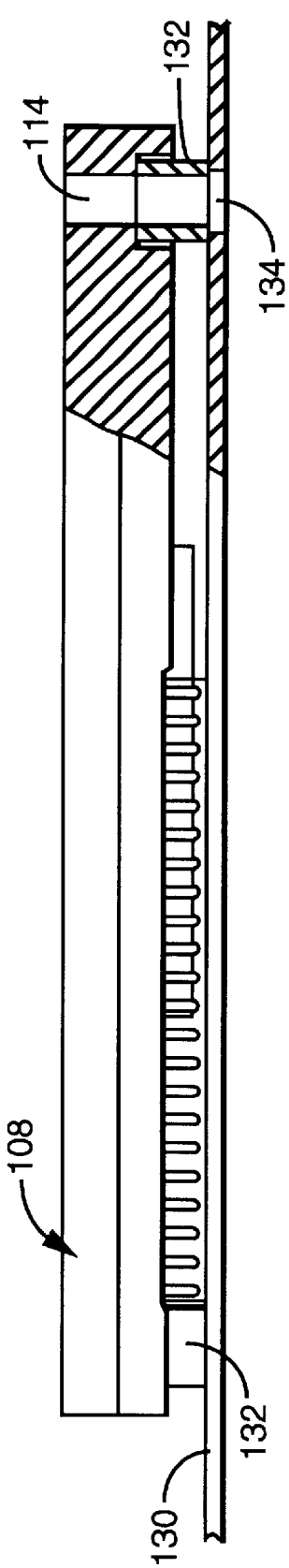
FIG. 6 is a side view of a fourth embodiment of the invention.

FIG. 6 is another side and cutaway view of an HDDA mounted in accordance with the present invention. HDDA 108 has the same configuration as shown in FIG. 5. As shown, however, disk drive assembly 108 is mounted directly to circuit board assembly 130 in a configuration similar to the embodiment shown in FIG. 3. Standoffs 132 keep HDDA 108 spaced apart from motherboard 130. HDDA 108 is secured to board 130 with conventional fasteners (not shown), e.g., screw and nut combinations extending through holes 114, standoffs 132, and holes 134 in board 130. Again, HDDA 108 is parallel to board 130 so that the thickness of the total assembly is minimized.

In other embodiments the connector pins on the hard disk drive assembly are essentially parallel to the underlying printed circuit board assembly. For these embodiments the mounting configuration is modified to allow the HDDA's connector to slide sideways into the mating connector on the underlying motherboard. FIG. 7 is a bottom view of HDDA 150 including connector 152. Connector 152 has a plurality of conductive pins 154 arranged in a conventional connector pattern. As shown, connector 152 is soldered to printed circuit board assembly 155 (a portion is shown) included in HDDA 150. Conventional L-shaped strain tabs (not shown) on the connector are also soldered to printed circuit board assembly 155 to give connector 152 additional support. Circuit board 155 is then secured to the hard disk assembly using, for example, screws.

Elongated recesses 158 surround holes 156 in HDDA 150. The recesses are sized to receive the standoffs used to space HDDA 150 from the underlying motherboard. To mount the drive to the motherboard, HDDA 150 is placed so that the standoffs are in the front portion 158*a* of recesses 158. The person mounting drive 150 then slides the drive forward on top of the standoffs to properly mate connector pins 154 with the corresponding female connector on the underlying motherboard. When the connectors are properly mated, holes 156 are aligned with corresponding holes in the standoffs and drive 150 is secured as described above to the underlying motherboard or a support chassis.

Spin motor housing 160 extends from the bottom surface 162 of HDDA 150. An elongated area on the underlying motherboard clear of circuit devices is therefore required to allow drive 150 to slide properly. Referring again to FIGS. 2 and 3, elongated clear area portion 48*a* is shown reserved to accommodate spin motor housing 160 during slide-in mounting. In addition, another clear area 49 is reserved in front of connector 42 to allow the slide-in mounting.

Figure 8:
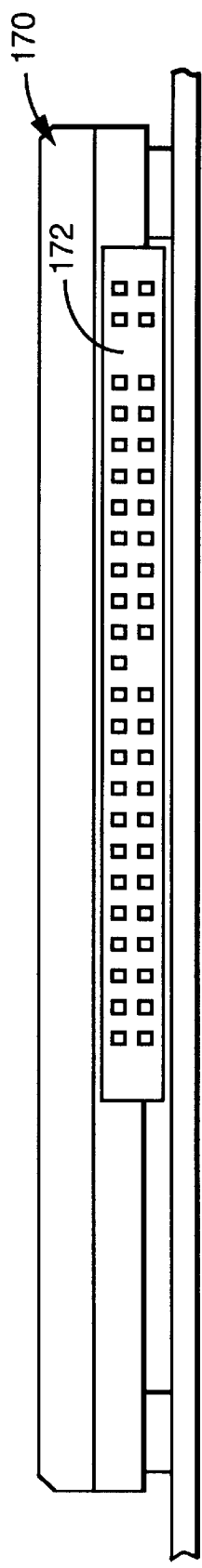
FIG. 8 is a side view of a hard disk drive assembly.
Figure 9:
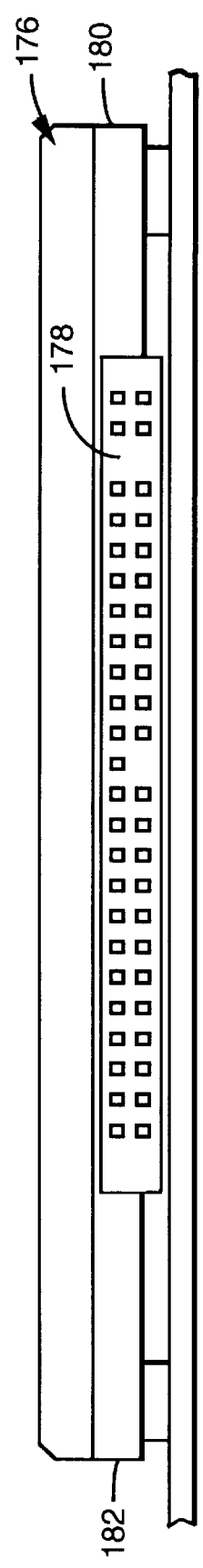
FIG. 9 is a side view of a hard disk drive assembly.

FIGS. 8 and 9 are side views of other hard disk drive assembly connector configurations in accordance with the invention. FIG. 8 shows HDDA 170 having horizontal connector 172 offset to one side. Such a configuration may allow the corresponding connector mounted on the underlying motherboard to be moved closer to a corner of the board. FIG. 9 shows HDDA 176 having horizontal connector 178 mounted mid-way between drive housing sides 180 and 182. Centrally locating connector 178 on HDDA 176 allows a smaller (e.g., 2.5 inch) drive to be substituted for the 3.0 inch drive shown, but without changing the configuration of the underlying motherboard except to accommodate repositioned offsets. The electrical connectors may be mounted to the HDDA as in the various configurations described above.

The present invention has been described in terms of specific embodiments. Others will appreciate, however, that many variations of the invention exist. The scope of the invention is therefore limited only by the following claims.

I claim:

1. A combination comprising:

a portable computer motherboard;

a first electrical connector positioned on the motherboard;

a hard disk drive assembly including a second electrical connector configured to mate with the first electrical connector; and a rigid standoff positioned between the motherboard and the hard disk drive assembly;

wherein the hard disk drive assembly is positioned such that the second connector is mated with the first connector, and the hard disk drive assembly is spaced apart from the motherboard by the standoff.

2. The combination of claim 1 wherein the hard disk drive assembly is substantially parallel to a surface of the motherboard.

3. The combination of claim 1 further comprising an integrated circuit package mounted on the motherboard, wherein at least a portion of the integrated circuit package is between the motherboard and the hard disk drive assembly.

4. The combination of claim 1 wherein the second connector is configured to mate with the first connector in a direction substantially perpendicular to the motherboard.

5. The combination of claim 1 wherein the second connector is configured to mate with the first connector in a direction substantially parallel to the motherboard.

6. A combination comprising:

a chassis;

a printed circuit board assembly;

a first electrical connector positioned on the printed circuit board assembly;

a hard disk drive assembly including a second electrical connector configured to mate with the first connector;

a standoff extending through the printed circuit board assembly and positioned between the chassis and the hard disk drive assembly;

wherein the second connector is mated with the first connector, and the hard disk drive assembly is spaced apart from the printed circuit board assembly by the standoff.

7. The combination of claim 6 wherein the hard disk drive assembly is substantially parallel to the surface of the printed circuit board assembly.

8. The combination of claim 6 further comprising an integrated circuit package mounted on the printed circuit board assembly, wherein at least a portion of the integrated circuit package is between the printed circuit board assembly and the hard disk drive assembly.

9. The combination of claim 6 wherein the second connector is configured to mate with the first connector in a direction substantially perpendicular to the printed circuit board assembly.

10. The combination of claim 6 wherein the second connector is configured to mate with the first connector in a direction substantially parallel to the printed circuit board assembly.

11. The combination of claim 6 wherein the chassis is a portion of a portable computer chassis.

12. A method of electrically connecting a hard disk drive assembly to a printed circuit board assembly, the method comprising the acts of:

providing a first electrical connector mounted on the printed circuit board assembly;

providing a second electrical connector on the hard disk drive assembly, wherein the second electrical connector is configured to mate with the first electrical connector; and connecting the second electrical connector to the first electrical connector so that the hard disk drive assembly is above a surface of the printed circuit board assembly.

13. The method of claim 12 further comprising the act of positioning the hard disk drive assembly on a standoff, wherein the standoff is configured to maintain a distance between the printed circuit board assembly and the hard disk drive assembly, and the distance is sufficient to allow at least a portion of an integrated circuit package to be mounted on the printed circuit board assembly between the printed circuit board assembly and the hard disk drive assembly.

* * * * *